United States Patent [19]

Inaba et al.

[11] Patent Number: 4,746,388

[45] Date of Patent: May 24, 1988

[54] CORRECTION METHOD

[75] Inventors: Masatsugu Inaba, Settsu; Takumi Murasaki, Neyagawa, both of Japan

[73] Assignee: Fuji Kagakushi Kogyo Co., Ltd., Osaka, Japan

[21] Appl. No.: 902,759

[22] Filed: Sep. 2, 1986

Related U.S. Application Data

[62] Division of Ser. No. 709,045, Mar. 7, 1985, Pat. No. 4,634,629.

[30] Foreign Application Priority Data

Mar. 9, 1984 [JP] Japan .................................. 59-45950

Nov. 27, 1984 [JP] Japan .................................. 59-251176

[51] Int. Cl.[4] .......................... B44C 1/17; B32B 1/00; B41J 11/60

[52] U.S. Cl. .................................... 156/241; 156/344; 400/696

[58] Field of Search ..................... 428/343, 355, 474.4, 428/475.2, 914, 261, 356, 349; 427/207.1, 208.4, 208.8; 156/230, 240, 241, 344; 400/696, 697, 697.1

[56] References Cited

U.S. PATENT DOCUMENTS

| | | | |
|---|---|---|---|
| 3,924,728 | 12/1975 | Brown et al. | 428/261 |
| 4,085,838 | 4/1978 | Pierce | 400/696 |
| 4,093,772 | 6/1978 | Taylor et al. | 400/696 |
| 4,406,912 | 9/1983 | Downing | 428/475.2 |
| 4,426,169 | 1/1984 | Hartmann | 428/523 |
| 4,434,207 | 2/1984 | Franey | 428/343 |
| 4,472,073 | 9/1984 | Valle et al. | 400/697.1 |
| 4,524,104 | 6/1985 | Hagio et al. | 428/355 |
| 4,548,845 | 10/1985 | Parsons et al. | 428/355 |

FOREIGN PATENT DOCUMENTS

| | | |
|---|---|---|
| 0093858 | 11/1983 | European Pat. Off. . |
| 1468471 | 3/1977 | United Kingdom . |
| 1468472 | 5/1977 | United Kingdom . |
| 2001554 | 2/1979 | United Kingdom . |
| 2006235 | 5/1979 | United Kingdom . |
| 1565920 | 4/1980 | United Kingdom . |

*Primary Examiner*—Donald E. Czaja

*Assistant Examiner*—Louis Falasco

*Attorney, Agent, or Firm*—Perman & Green

[57] ABSTRACT

A lift-off tape capable of being used many times which comprises a foundation and an adhesive layer provided on one major surface of the foundation, said adhesive layer containing a plasticizer capable of plasticizing a polyamide resin which is a main component of the vehicle of a correctable ink. The lift-off tape can be used many times to remove erroneous typed impressions of a correctable ink which contains a polyamide resin as a main component of the vehicle thereof.

11 Claims, No Drawings

CORRECTION METHOD

This is a divisional of co-pending application Ser. No. 709,045, filed on Mar. 7, 1985, now U.S. Pat. No. 4,634,629.

BACKGROUND OF THE INVENTION

The present invention relates to a lift-off tape. More particularly, it relates to a lift-off tape for peeling off or removing erroneous ink impressions formed by impact on recording paper from a correctable ink ribbon.

Heretofore, in impact typewriters, there have often been used adhesive correction tapes called "lift-off tape" which are normally tacky or made tacky by the application of pressure or other stress even though they are normally nontacky, and have the capability of peeling off ink impressions.

Such correction tape is so designed that erroneous typed ink impressions on recording paper are peeled off and transferred onto the tape by typing using usual typewriters. Such lift-off tapes are disclosed, e.g., in Japanese Published Unexamined Patent Application Nos. 41941/1979 and 122315/1975.

In the case of a conventional lift-off tape, its portions that are once used are covered with the correctable ink of the removed ink impression. When the used portions are reused, the correctable ink will reduce the peeling-off force of the adhesive layer to the extent that impressions cannot be removed as neatly as when the tape is used for the first time. Thus, it has been considered in prior technique that the lift-off tape is usable only once.

SUMMARY OF THE INVENTION

It is an object of the invention to provide a lift-off tape which can be used many times even where its portions are covered with correctable ink.

This and other objects of the invention will become apparent from the description hereinafter.

The present invention provides a lift-off tape which can be used many times, comprising a foundation, and an adhesive layer provided on one major surface of the foundation, the adhesive layer containing a plasticizer capable of plasticizing a polyamide resin which is a main component of the vehicle of a correctable ink.

DETAILED DESCRIPTION

The aforesaid features of the invention enable the correctable ink which has adhered to the adhesive layer (hereinafter referred to as lift-off layer) of the lift-off tape to develop the impression peeling-off action, thus enabling the tape to be used many times.

Stated in more detail, correctable ink on correctable ink ribbons is generally in the form of a weak or frail film containing a polyamide resin as a main component of the vehicle for retaining the capability of the lift-off tape to peel off impressions from recording paper. When impressions of such correctable ink adhere to the above-specified lift-off layer, the ink is rendered tacky by the action of the plasticizer which has migrated into the ink, thus developing the ability to pick off typed impressions.

Such function and effect of the specific plasticizer contained in the lift-off layer make it possible to use a lift-off tape many times, which previously has been considered impossible.

The invention will now be described more concretely.

The lift-off layer in the lift-off tape of the invention is a layer formed by incorporating the above-specified plasticizer in a usual lift-off layer composed mainly of a rubber-like resin and a tackifier.

The rubber-like resin is a binder for fixing the tackifier and other components to the foundation.

The plasticizer used in the invention may be any plasticizer that exerts a plasticizing action on the polyamide resin in the correctable ink. Typical examples of plasticizers of such a nature are oleic acid, isostearic acid, polyoxyethylene castor oil, polyoxyethylene oleylamine, coconut oil fatty acid diethanolamide, polyoxyethylene lauryl ether, polyoxyethylene nonylphenyl ether, di(polyoxyethylene alkyl ether) phosphate, trimethylolpropane monoerucate, sorbitan monolaurate, sorbitan sesquioleate, and polyoxyethylene sorbitol tetraoleate. These plasticizers may be used singly or as mixtures of two or more of them.

In a combination of the plasticizer with a tackifier which is a main component of the lift-off layer, the plasticizer does not have a plasticizing action on the tackifier.

In the case of using a plasticizer which has substantially no plasticizing action on the tackifier, the lift-off layer itself does not become plasticized and there is no possibility that the lift-off layer will become extremely softened to the extent of being peeled off from the foundation, or that the softness of the lift-off layer will be influenced very much by a decrease of the content of the plasticizer in the lift-off layer which is caused by repeated uses of the lift-off tape. Thus, there will take place no change which causes interference with usage, such as hardening of the layer.

The amount of the plasticizer used is preferably in the range of 0.1 to 50 parts (parts by weight, hereinafter the same) when the amount of the tackifier used is taken to be 10 parts. The amount is preferably in the range of 0.5 to 30 parts, more preferably 2 to 20 parts per 10 parts of the tackifier. If the amount of the plasticizer used is less than the above range, the plasticization of the correctable ink peeled off from the recording paper and adhering to the lift-off layer would be insufficient, considerably degrading the removal of impressions in reuse. On the other hand, if it is more than the above range, the correctable ink peeled off from the recording paper and adhering to the lift-off layer would be plasticized too much, involving the danger that the correctable ink plasticized would be transferred again to the recording paper during reuse.

Usually, the plasticizer is present in the lift-off layer in such a state that it is homogenously dissolved or dispersed in other components. In particular, in the case of a plasticizer having no plasticizing action on the tackifier, it may be present in the lift-off layer in such a state that it is contained in microcapsules, the strength of which is adjusted so that the microcapsules can be colapsed by the application of type pressure.

Examples of the rubber-like resin include, for instance, styrene-butadiene copolymer, polyester resin, vinyl chloride-vinyl acetate copolymer, polyvinyl butyral, and ethylene-vinyl acetate copolymer.

This rubber-like resin is used preferably in an amount of 0.5 to 100 parts when the amount of the tackifier is taken to be 10 parts. Particularly in the case of using a plasticizer having no plasticizing action on the tackifier, the amount of the rubber-like resin used is preferably in the range of 1 to 60 parts, more preferably 2 to 50 parts per 10 parts of the tackifier.

Examples of the tackifier include, for instance, epoxy resin, styrene resin, acrylic resin, ketone resin, xylene resin, gum rosin, and α-pinene resin. These may be used singly or as mixtures of two or more of them.

In the case of using a plasticizer having no plasticizing action on the tackifier, a non-volatile liquid is preferably incorporated to assist in plasticization of the tackifier. Examples of the non-volatile liquid include, for instance, various animal and mineral oils, dioctyl phthalate, tricresyl phosphate, dibutyl phthalate, butyl benzyl phthalate, liquid tape polybutene, terpene oligomer, and liquid type polybutadiene. In this case, the amount of the non-volatile liquid used is in the range of 1 to 30 parts, preferably 3 to 25 parts per 10 parts of the tackifier.

The lift-off layer in accordance with the present invention may be normally tacky, or made tacky by the application of pressure or other stress even though it is normally nontacky.

A tackiness-reducing agent or a lubricant may be added in order to improve the run of the lift-off tape or other properties. Examples of the tackiness-reducing agent are various waxes, low molecular weight polyethylene, and various inorganic powders. Examples of the lubricants are zinc molybdate, silicone resin, silicone oil, talc, mica powder and other flaky body pigments. The amount of the tackiness-reducing agent used is preferably 30 parts or less, more preferably 20 parts or less per 10 parts of the rubber-like resin. The amount of the lubricant used is preferably 30 parts or less, more preferably 20 parts or less per 10 parts of the rubber-like resin.

Examples of the foundation are polyester film, nylon film, Vinylon film, cellophane, polypropylene film, and polyethylene film.

The present invention is more particularly described and explained by means of the following Examples. These Examples are intended to illustrate the invention and not be construed to limit the scope of the invention. It is to be understood that various changes and modifications may be made in the invention without departing from the spirit and scope thereof.

EXAMPLES 1 TO 7

In these Examples, a combination of a tackifier and a plasticizer having no plasticizing action thereon was used.

Each of lift-off layer compositions shown in Table 1 was uniformly blended by a ball mill. The mixture was applied to a polyester film having a thickness of 38 μm and the solvent was allowed to volatilize to form a lift-off layer having a thickness of 20 μm. The resulting film was cut into stripes each having a width of 7 mm and a length of 6.5 m, each of which was taken up on a spool.

Such spool with a lift-off tape wound thereon was installed in a typewriter (Canon AP 500 made by Canon Corporation) to test the tape for its ability of peeling-off or removing letters typed using a usual correctable ink ribbon in which a polyamide resin was used as a main component of the ink vehicle.

Removal operation was repeated throughout the length of the lift-off tape, and it was found that the same quality of removal as for the 1st time of use was exhibited until about the 4th time of use. At the 8th time use, fine ink dust was left on the recording paper, but this little influenced the clearness of retyped impressions.

TABLE 1

| Component | Ex. 1 | Ex. 2 | Ex. 3 | Ex. 4 | Ex. 5 | Ex. 6 | Ex. 7 |
|---|---|---|---|---|---|---|---|
| Rubber-like resin | | | | | | | |
| Styrene-butadiene copolymer | — | 5 | — | 5 | — | — | 2 |
| Polyvinyl butyral | 10 | — | — | — | — | 7 | — |
| Ethylene-vinyl acetate copolymer | — | — | 12 | — | 3 | — | — |
| Tackifier | | | | | | | |
| Epoxy resin | 2 | — | — | — | — | 3 | — |
| Styrene resin | — | 4 | — | — | — | — | — |
| Ketone resin | — | — | 3 | — | — | — | 10 |
| Acrylic resin | — | — | — | 4 | — | — | — |
| Styrene-acrylic ester copolymer | — | — | — | — | 8 | — | — |
| Non-volatile liquid | | | | | | | |
| Mineral oil | 4 | | | | — | — | — |
| Liquid type polybutene | — | 10 | — | — | 6 | — | 4 |
| Dioctyl phthalate | — | — | 2 | — | — | 2 | — |
| Dibutyl phthalate | — | — | — | 3 | — | — | — |
| Plasticizer for polyamide | | | | | | | |
| Oleic acid | 4 | — | — | — | — | — | — |
| Polyoxyethylene oleylamine | — | 1 | — | — | — | — | — |
| Coconut oil fatty acid diethanolamide | — | — | 3 | — | — | — | — |
| Polyoxyethylene sorbitol tetraoleate | — | — | — | 8 | — | — | — |
| Polyoxyethylene nonylphenyl ether | — | — | — | — | 2 | — | — |
| Trimethylolpropane monoerucate | — | — | — | — | — | 6 | — |
| Sorbitan monolaurate | — | — | — | — | — | — | 2 |
| Tackiness-reducing agent | | | | | | | |
| Paraffin wax | — | — | — | — | — | 2 | — |
| Low molecular weight polyethylene | — | — | — | — | — | — | 1 |
| Lubricant | | | | | | | |
| Zinc molybdate | — | — | — | — | 1 | — | — |
| Talc | — | — | — | — | — | — | 1 |
| Volatile solvent | | | | | | | |
| Toluene | 40 | 60 | 60 | 60 | 60 | 40 | 60 |

TABLE 1-continued

| Component | Ex. 1 | Ex. 2 | Ex. 3 | Ex. 4 | Ex. 5 | Ex. 6 | Ex. 7 |
|---|---|---|---|---|---|---|---|
| Isopropyl alcohol | 20 | — | — | — | — | 20 | — |

Note: The unit of numerical values in Table 1 is parts.

COMPARATIVE EXAMPLES 1 TO 7

Seven kinds of lift-off tapes were prepared in the same manner as in Examples 1 to 7 except that the plasticizer for polyamide was removed from each composition shown in Table 1. These lift-off tapes were tested for their ability of removing impressions, in the same manner as in the aforesaid test. As a result, it was found that at the clearness of retyped impressions after the 3rd or 4th time of use was considerably inferior to that obtained after the 4th time of use in each of Examples 1 to 7.

In addition, in the case where the amount of plasticizer used in each of Examples 1 to 7 was reduced to 0.1 part per 10 parts of the tackifier, it was after the tape was repeatedly used more than about 6 times that the unclearness of retyped impressions was the same as when the tape in each Comparative Example was used for the 3rd time.

EXAMPLES 8 TO 12

In these Examples, a combination of a tackifier and a plasticizer having a plasticizing action thereon was used.

The same procedures as in Examples 1 to 7 except that each of lift-off layer compositions shown in Table 2 was used were repeated to give lift-off tapes. With respect to the lift-off tapes, the ability of peeling-off or removing impressions was determined in the same manner as in Examples 1 to 7.

Removal operation was repeated throughout the length of the lift-off tape, and it was found that the same quality of removal as for the 1st time of use was exhibited until about the 4th time of use. When the tape was used more than four times, fine ink dust was left on the recording paper, but this little influenced the clearness of retyped impressions.

TABLE 2

| Component | Ex. 8 | Ex. 9 | Ex. 10 | Ex. 11 | Ex. 12 |
|---|---|---|---|---|---|
| Rubber-like resin | | | | | |
| Styrene-butadiene copolymer | 10 | — | — | 6 | — |
| Polyvinyl butyral | — | 10 | — | — | — |
| Ethylene-vinyl acetate copolymer | — | — | 10 | — | 10 |
| Tackifier | | | | | |
| Styrene resin | 8 | — | — | — | — |
| Acrylic resin | — | 8 | — | 10 | — |
| α-Pinene resin | — | — | 10 | — | 10 |
| Non-volatile liquid | | | | | |
| Terpene oligomer | — | 1 | — | — | — |
| Liquid type polybutadiene | — | — | — | 2 | — |
| Liquid type polybutene | — | — | — | — | 2 |
| Plasticizer for polyamide | | | | | |
| Trimethylolpropane monoerucate | 7 | — | — | — | — |
| Polyoxyethylene oleylamine | — | — | 5 | — | — |
| Sorbitan monolaurate | — | — | — | 2 | — |
| Oleic acid | — | 5 | — | — | 2 |
| Isostearic acid | — | — | — | — | 1 |
| Tackiness-reducing agent or Lubricant | | | | | |
| Low molecular weight polyethylene | — | — | — | — | 5 |
| Finely powdered silica | — | — | 2 | — | — |
| Zinc molybdate | — | — | 3 | 10 | — |
| Talc | — | — | — | — | 5 |
| Volatile solvent | | | | | |
| Toluene | 70 | 50 | 70 | 70 | 65 |
| Isopropyl alcohol | — | 25 | — | — | — |

Note: The unit of numerical values in Table 2 is parts.

COMPARATIVE EXAMPLES 8 TO 12

Five kinds of lift-off tapes were prepared in the same manner as in Examples 8 to 12 except that polybutadiene was used as a plasticizer which hardly or does not at all plasticize polyamide resin instead of the plasticizers shown in Table 2. These tapes were tested for their ability of removing impressions in the same manner as in Examples 1 to 7. As a result, it was found that the clearness of retyped impressions after second time of use was considerably inferior to that obtained after the 4th time of use in each of Examples 8 to 12.

As is clear from these results, the lift-off tape of the present invention can be used many times, which fact has heretofore been considered impossible.

In addition to the ingredients or elements used in the Examples, other ingredients or elements can be used in the Examples as set forth in the specification to obtain substantially the same results.

What we claim is:

1. A method for removing correctable images, applied to an original sheet by means of type ink containing a resin as the main component thereof, with a lift-off correction element which comprises:

(a) using as a correction element a pressure-sensitive lift-off correction element having a pressure-sensitive adhesive layer containing a tackifier resin which is a resin other than the resin present in the correctable images to be removed from the original sheet, and a sufficient amount of a plasticizer which is capable of plasticizing the resin of said correctable images but is not capable of plasticizing said tackifier resin;

(b) impacting the pressure-sensitive adhesive layer of said correction element against the correctable images which are typed onto an original sheet to adhere the correctable images to the adhesive layer, and removing the adhesive layer from the original sheet, whereby the correctable images which are adhered to the adhesive layer and removed from the original sheet are rendered adhesive by said plasticizing action to permit additional correctable images of type of ink to be adhered in registration thereover; and (c) repeating the correcting operation of step (b) several times over the same areas of the adhesive layer still bearing the correctable image removed in the previous step (b) to provide the same quality of image-removal as the first time.

2. The method of claim 1 wherein said plasticizer of said adhesive layer comprises oleic acid.

3. The method of claim 1 wherein said plasticizer of said adhesive layer comprises polyoxyethylene oleylamine.

4. The method of claim 1 wherein said plasticizer of said adhesive layer comprises coconut oil fatty acid diethanolamide.

5. The method of claim 1 wherein said plasticizer of said adhesive layer comprises polyoxyethylene sorbitol tetraoleate.

6. The method of claim 1 wherein said plasticizer of said adhesive layer comprises polyoxyethylene nonylphenyl ether.

7. The method of claim 1 wherein said plasticizer of said adhesive layer comprises trimethylolpropane monoerucate.

8. The method of claim 1 wherein said plasticizer of said adhesive layer comprises sorbitan monolaurate.

9. The method of claim 1 in which said tackifier resin is selected from the group consisting of epoxy resin, styrene resin, acrylic resin, ketone resin, xylene resin, gum rosin and alpha pinene resin.

10. The method of claim 1 in which said pressure-sensitive adhesive layer also comprises a rubber-like resin binder material which is a resin other than the resin present in the correctable images to be removed.

11. The method of claim 10 in which said binder material is selected from the group consisting of styrene-butadiene copolymer, polyester resin, vinyl chloride-vinyl acetate copolymer, polyvinyl butyral and ethylene-vinyl acetate copolymer.

* * * * *